United States Patent [19]

Baldock

[11] Patent Number: 4,739,491
[45] Date of Patent: Apr. 19, 1988

[54] LIST LOOK-AHEAD FOR CONTROL OF BIN LAMP INDICATORS

[75] Inventor: Raymond K. Baldock, Oakland, N.J.
[73] Assignee: Sony Corporation, Tokyo, Japan
[21] Appl. No.: 849,015
[22] Filed: Apr. 7, 1986
[51] Int. Cl.⁴ .................. G11B 15/00; G11B 23/00
[52] U.S. Cl. .................................. 364/478; 360/92
[58] Field of Search .................. 364/478; 360/91, 92

[56] References Cited

U.S. PATENT DOCUMENTS

| | | | |
|---|---|---|---|
| 3,825,949 | 7/1974 | Pyles | 360/91 |
| 3,879,758 | 4/1975 | Pyles | 360/92 |
| 4,145,724 | 3/1979 | Medding et al. | 360/92 |
| 4,622,610 | 11/1986 | Makigawa | 360/92 |
| 4,644,425 | 2/1987 | Tamaki | 360/71 |

Primary Examiner—Jerry Smith
Assistant Examiner—Allen MacDonald
Attorney, Agent, or Firm—Lewis H. Eslinger

[57] ABSTRACT

A method of assisting a user to supply tape cassettes from a tape library to an on-line storage facility that has a limited capacity A and facilitates automatic feeding of the tapes to VTRs in a series of events comprises the steps of preparing a master list setting forth the events in a sequence from top to bottom and tape cassettes respectively corresponding thereto, identifying tape cassettes currently in the on-line storage facility, and selecting a critical load area consisting of a predetermined number of events N from the current top of the list, where $0 \leq N \leq A$. A determination is made of a first set consisting of first priority tape cassettes to be housed in the on-line facility for subsequent automatic feeding to the VTRs, a second set consisting of second priority tape cassettes to be withdrawn from the on-line storage facility to make room for insertion of additional tape cassettes from the tape library and retained for subsequent reinsertion in the on-line storage facility, and a third set consisting of zero priority tape cassettes to be withdrawn from the on-line storage facility and returned to the tape library. The results of this determination are signaled to the user of the system.

7 Claims, 2 Drawing Sheets

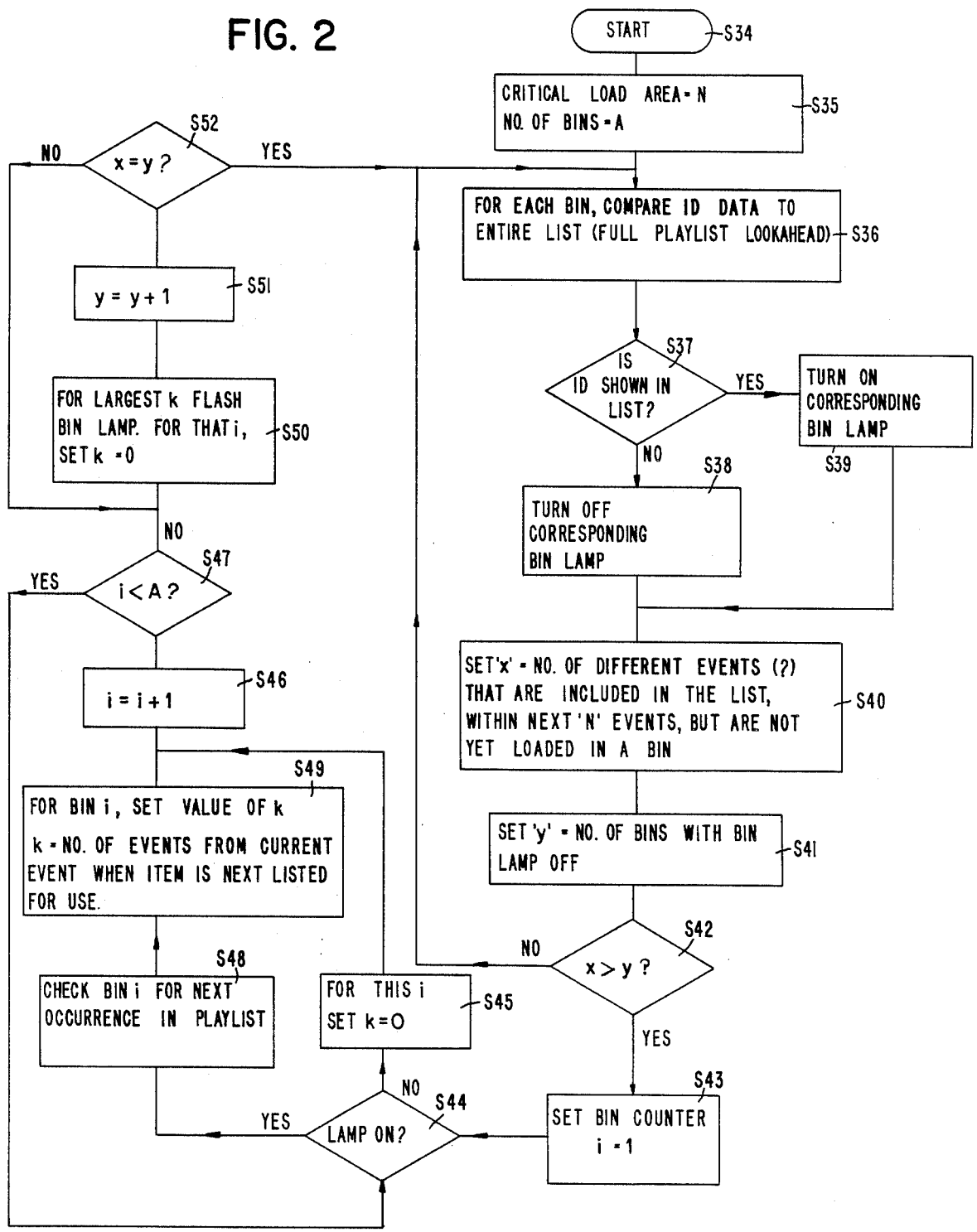

LIST LOOK-AHEAD FOR CONTROL OF BIN LAMP INDICATORS

BACKGROUND OF THE INVENTION

1. Field of the Invention

This invention relates to supplying items such as tape cassettes from a master storage facility such as a tape library to an on-line storage facility that facilitates automatic feeding of the items to a processing station such as a station including one or more tape recorder/reproducers (VTRs) in a broadcast studio.

2. Description of the Prior Art

In television and other broadcasting it is common practice to piece together a program largely from prerecorded segments. These segments are recorded on separate tape cassettes and stored in a tape library. A television station scheduling department compiles a master list of events consisting of prerecorded segments and "live" segments or other "off-machine" events. The master list sets forth the events in a sequence from top to bottom and represents a program for broadcast.

Before broadcast of the program begins, the cassettes containing the segments to be broadcast early in the program are stored in an on-line storage facility or multi-cassette receiver. In combination with certain electromechanical apparatus, this facility feeds the cassettes automatically in proper sequence to one or more video tape recorders (VTRs) that reproduce the recorded signals for broadcast. After each segment is reproduced and broadcast, the tape cassette on which it is recorded is automatically returned to the on-line storage facility. Since the master list of events normally substantially exceeds the capacity of the on-line storage facility to store simultaneously the tape cassettes for a complete program, it is necessary to add new cassettes from the library that appear farther down the master list to the on-line storage facility as the program is broadcast. To make room for the new cassettes, it is necessary to withdraw cassettes that are already stored in the on-line storage facility.

In conventional practice, it is a problem to determine which cassettes to withdraw from the on-line storage facility in order to make room for new cassettes. Normally, some of the cassettes in the on-line storage facility need to be supplied to the VTR station more than once. Such cassettes may include commercials, program themes, important news stories, etc. Thus, it is not a solution simply to withdraw each cassette from the on-line storage facility as soon as it has returned from one trip to the VTR station. Other cassettes need to make only one trip to the VTR station, but to determine which cassettes fall into this category and to withdraw them without error and in a timely manner requires vigilance by the user of the system. The identity of each cassette in the on-line storage facility and its place on the master list needs to be checked carefully and repeatedly in order to avoid mistakes. Particularly if the user or operator of the system has other duties and cannot monitor the system continuously, this may present a serious problem.

Co-pending application Ser. No. 06/719,066, filed Apr. 2, 1985, now U.S. Pat. No. 4,644,425, and assigned to the assignee of the present application, discloses apparatus for automatically supplying tape cassettes from a multi-cassette receiver to cassette reproducing apparatus and the use of lights to signal proper reading of bar codes on the tape cassettes. Other automatic changers for cassette recording/reproducing apparatus. are disclosed in U.S. Pat. Nos. 3,825,949 and No. 3,879,758 to Pyles and U.S. Pat. No. 3,852,819 to Starr. None of these documents discloses a solution to the problems outlined above.

OBJECTS AND SUMMARY OF THE INVENTION

An object of the invention is to solve the problems outlined above by providing assistance to a user or operator of the system in supplying items such as tape cassettes from a master storage facility such as a tape library to an on-line storage facility such as a multi-cassette receiver that facilitates automatic feeding of the items to a processing station such as a station including one or more tape recorder/reproducers (VTRs) in a broadcast studio.

More particularly, an object of the invention is to maximize the efficiency of the system by identifying to a user of the system the tape cassettes to withdraw from the on-line multi-cassette receiver and informing the user whether to retain the withdrawn tape cassettes for subsequent reinsertion in the receiver or return them to the tape library.

In accordance with one aspect of the invention, there is provided a method of assisting a user to supply items from a master storage facility to an on-line storage facility that has a capacity of A items and facilitates automatic feeding of the items to a processing station in a series of events; the method comprising the steps of: preparing a master list of events setting forth the events in a sequence from top to bottom and items respectively corresponding thereto; identifying items currently in the on-line storage facility; selecting a critical load area consisting of a predetermined number of events N from the current top of the list, where $0 \leq N \leq A$; making a determination of: a first set consisting of first priority items to be housed in the on-line storage facility for subsequent automatic feeding to the processing station; a second set consisting of second priority items to be withdrawn from the on-line storage facility to make room for insertion of additional items from the master storage facility and retained for subsequent reinsertion in the on-line storage facility; and a third set consisting of zero priority items to be withdrawn from the on-line storage facility and returned to the master storage facility; and signaling the results of said determination to the user.

BRIEF DESCRIPTION OF THE DRAWING

A better understanding of the objects, features and advantages of the invention can be gained from the following detailed description of the preferred embodiment thereof, in conjunction with the appended figures of the drawing, wherein any given reference character always refers to the same element or part, and wherein:

FIG. 2 is a flow chart illustrating the preferred operation of the apparatus of FIG. 1 in accordance with the invention.

DESCRIPTION OF THE PREFERRED EMBODIMENT

Figure 1:
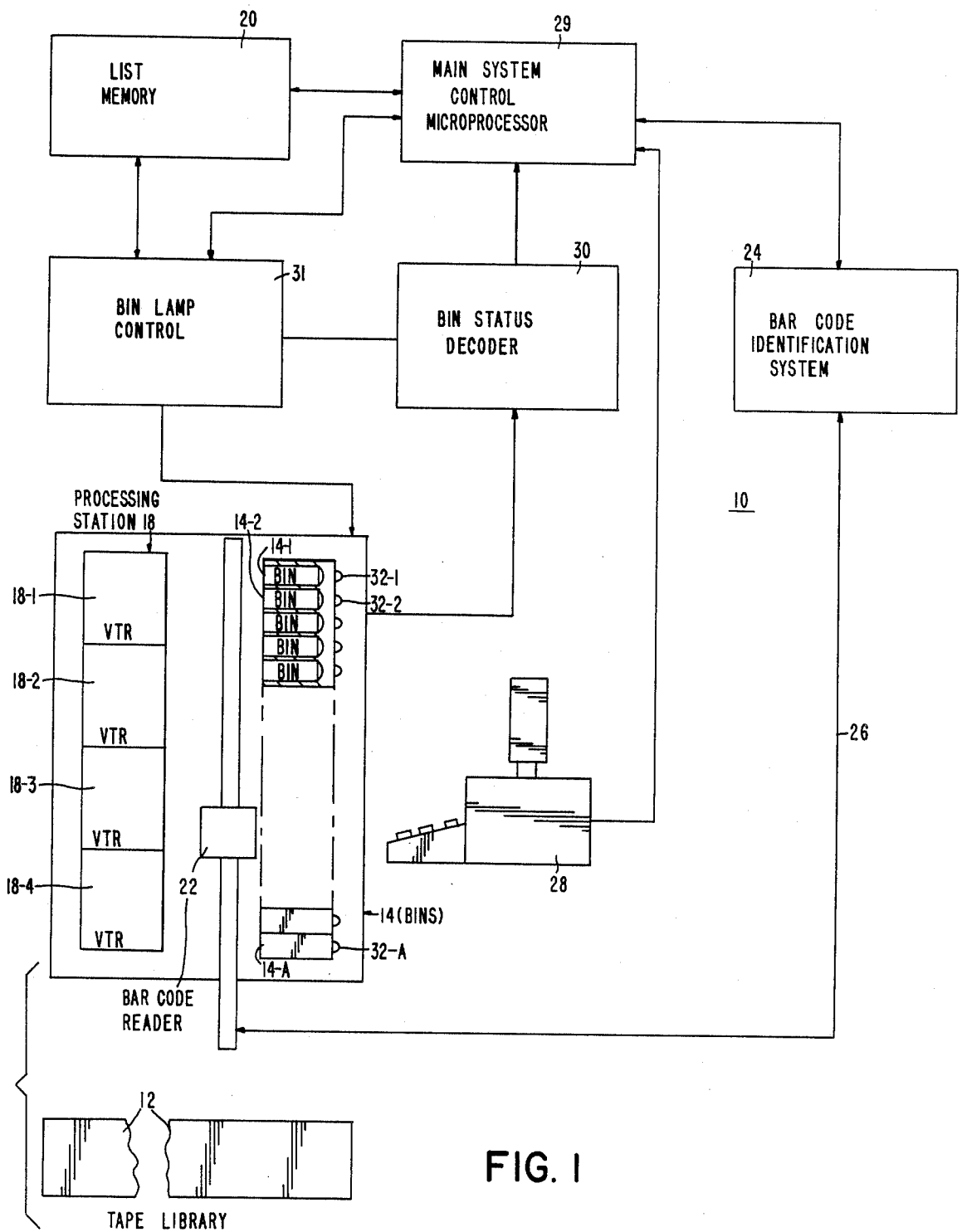
FIG. 1 is a schematic block diagram of apparatus adapted for use in accordance with the invention.

FIG. 1 shows apparatus 10 adapted for use in accordance with the invention. The apparatus 10 may be a model BVC-10 made by Sony Corporation, the assignee of the present application, and is used to assist a user or operator of the apparatus in supplying items from a tape library 12 to an on-line storage facility such as an on-line multi-bin tape cassette receiver 14. The receiver 14 has a limited capacity A of, for example, forty tape cassettes in bins 14-1 through 14-A. In cooperation with a bar code reader 22 of the type disclosed in said co-pending application or any conventional cassette changer apparatus, the receiver 14 automatically supplies the tape cassettes therein to a processing station shown schematically at 18. The processing station 18 may comprise a plurality of VTRs 18-1 through 18-4 that are used sequentially to reproduce signals in the cassettes for broadcast.

The apparatus 10 comprises a list memory 20 for memorizing a master list of events in a sequence from top to bottom and the tape cassettes respectively corresponding thereto. The bar code reader 22 serves as identifying means for identifying tape cassettes currently in the receiver 14 and the portions thereof to be broadcast. This is done by reading identification numbers affixed to the respective cassettes. The identification numbers are bar-encoded and thus machine readable. The bar code reader 22 communicates with a bar code identification system 24 over a two-way data link 26 providing for control of the bar code reader 22 and return of data to the bar code identification system 24.

A data entry and display terminal 28 connected to a main system control microprocessor 29 enables a user to select a critical load area consisting of a predetermined number of events N from the current top of the list, where $0 \leq N \leq A$. For example, if A, the capacity of the receiver 14, is 40, N may range from 0 to 40.

Each bin 14-1 through 14-A has sensing means (not shown) that indicates whether the bin is occupied or empty. This is detected by a bin status decoder 30 that sets a flag for the microprocessor 29 showing which bin's status has changed. This subsystem then instructs the bar code identification system 24 to visit such bin and identify the contents of the bin. The bar code reader 22 then visits the bin and scans the bar code label attached to the cassette in order to make the identification. Information produced by this scan is decoded by the bar code identification system 24, which sets up a table of contents for the on-line storage bins. In this manner, the microprocessor 29 can cross-reference the identification number of any cassette to the number of the bin in which it is stored.

The apparatus 10 continually updates the master list of events, giving the identification numbers of the cassettes in the chronological order in which the cassettes will be required. A comparison is made by the microprocessor 29 of the identification numbers in the list and those contained in the on-line receiver 14. When there is a positive comparison the receiver instructs the bin lamp control 31 to light the bin lamp of the bin where the cassette is stored. A lighted bin lamp indicates that the cassette is required and should not be removed from its bin.

The user of the system removes the cassette from any bin whose associated bin lamp is turned off and adds new cassettes to those bins. The new cassettes are selected in sequence from the master list. The microprocessor 29 checks the status of each bin, incrementing a bin counter as it proceeds, and assigns values to y and k as it checks each bin. The value y is the number of bins with bin lamp off, and the value k measures for each bin how soon (in terms of the number of events) the cassette stored therein will be used (or used again). The value k, in other words, is the number of events from the current top of the list.

The microprocessor causes bin lamps to flash on and off according to the value set by the user for the critical load area N and the current value of x. The value of x is the number of cassettes that are to be used within the next N events but that have not yet been loaded into the receiver 14.

In accordance with the invention, the tape cassettes are assigned one of three priorities, as follows:

A first set consists of first priority tape cassettes to be left in the receiver 14 for subsequent automatic feeding to the VTRs 18.

A second set consists of second priority tape cassettes to be withdrawn from the receiver 14 to make room for insertion of additional tape cassettes from the tape library 12 and retained for subsequent reinsertion in the receiver 14.

A third set consists of zero priority items to be withdrawn from the receiver 14 and returned to the tape library 12.

The manner in which the cassettes are assigned to one of the three categories is described in detail below.

Lamps 32-1 through 32-A, one for each of the bins 14-1 through 14-A, serve as signaling means for signaling the results of the determination described above to the user of the system. For example, a tape cassette in the first or highest priority category may be indicated by placing the associated lamp in the "on" state; a tape cassette in the second priority category to be withdrawn from the receiver 14 and retained for subsequent reinsertion in the receiver 14 may be indicated by flashing the lamp associated therewith alternately between the "on" and "off" states; and a tape cassette of zero priority to be withdrawn from the receiver 14 and returned to the tape library 12 may be indicated by placing the lamp associated therewith in the "off" state.

The signaling is updated or justified in connection with each event: i.e., as each event on the master list is executed, the priority of each subsequent event is upgraded by 1. For example, an event that was third on the list becomes second, an event that was fourteenth on the list becomes thirteenth, an event that was fiftieth on the list becomes forty-ninth, etc.

Briefly, the determination referred to above, which is updated or justified upon execution of each event, comprises the steps of inspecting the current balance of the master list; determining the cassettes equal in number to y that are in the receiver 14 but not in the current balance of the master list; assigning the y cassettes to the third set of zero priority items; inspecting the next N events; determining the cassettes equal in number to x that are to be used within the next N events but that have not yet been loaded into the receiver 14; determining the cassettes equal in number to x-y that are in the receiver 14 but stand farthest from the top of the master list; assigning the x-y cassettes to the second set of second priority items; withdrawing said y items and said x-y items from the receiver 14 to make room for said x items; inserting said x items in the receiver 14; and assigning the inserted x items and the remaining items in the receiver 14 to the first set of first priority items.

FIG. 2 discloses the operation of the apparatus in greater detail. The program start is indicated at S34. At step S35 the critical load area N and the total number of bins A are noted. Their values are entered by the user via the terminal 28. The value of A is a constant for a given machine 14. The value of N is selected as may be convenient. Typically, higher values of N will be selected where the individual segments for broadcast are short and lower values of N will be selected where the segments are long. At step S36, for each of the bins 14-1 through 14-A, a comparison is made of the identification data for the corresponding cassettes stored therein to the entire master list. This is known as a "full list look-ahead". At step S37, a determination is made whether or not the identification data for the tape cassette in a particular bin under consideration is shown in the balance of the list. If it is not shown, then at step S38, the lamp corresponding to the bin under consideration is turned off. If at step S37 it is determined that the identification data for the cassette in the bin under consideration is found in the balance of the list, the lamp corresponding thereto is turned on at step S39.

All of the cassettes included in the balance of the list but not yet loaded into the receiver 14 have their bin locations indicated by "?". At step S40, the value x is set equal to the number of different events "?" that are included in the balance of the list within the next N events. The events "?" within the next N events on the master list have higher priority (i.e., are to be used sooner) than at least some of the cassettes already stored in the receiver 14.

At step S41, the value y is set equal to the number of bins with the bin lamp in the "off" state (which has been determined at step S38).

At step S42, a determination is made whether or not x is greater than y. If x is not greater than y, then the number of bins with the bin lamp in the "off" state is great enough to accommodate the number of tape cassettes that must be inserted. Since the tape cassettes in the bins with the lamp in the "off" state do not appear in the balance of the list and will not be used again during the program (see steps S36 and S37), they can be safely removed from the receiver 14 and returned to the tape library 12. Consequently, the program loops back from step S42 to step S36 and executes the same subroutine again. If during any cycle through this subroutine x becomes greater than y, as determined at step S42, then, at step S43, the bin counter i is set equal to 1.

At step S44, a determination is made whether or not the lamp associated with the bin under consideration is on. If the lamp is off, then for this bin the value of k, which is a measure of priority, is set equal to zero at step S45. This means that the cassette in this bin is not required again during the balance of the program and thus has zero priority. At step S46, the bin counter is incremented to i+1. At step S47, a determination is made whether or not the bin counter is still equal to or less than the capacity A of the receiver 14. (As noted above, A may be equal for example to 40.) If so, the program loops back to step S44 and makes a determination whether or not the lamp for the next bin is turned on. It cycles in a similar manner through all of the bins. In the case of bins where the associated lamp is turned on (step S44), then at step S48 that bin is checked for the next occurrence in the master list. At step S49, for that bin, the value of k is set equal to the number of events from the current event when the associated cassette is next listed for use. For example, if it is to be used in the next event, k equals 1. If it is to be used in the second event following the current event, k equals 2, etc.

After all A (e.g., 40) of the bins have been checked in this manner, at step S47 the determination will be that i is not less than A. At this point, for the largest k (lowest priority), the associated bin lamp is caused to flash at step S50, and k is set equal to zero. This indicates to the user of the system that the most efficient strategy is to withdraw the associated tape cassette but to retain it for subsequent reinsertion in the machine 14, since the tape cassette is scheduled for later use.

At step S51, the value of y is incremented by 1, reflecting the fact that there is now an additional bin available for storage of a tape cassette.

At step S52, a determination is made whether or not x equals y. If so, provision has been made for accommodation of all of the tape cassettes that need to be in receiver 14 for use during the next N events (it will be recalled that this loop is not entered unless, at step S42, x is found to exceed y). In that case, from step S52 the program recycles to step S36. If at step S52 it is determined that x does not equal y, then provision has not been made for all of the cassettes that need to be accommodated in the machine 14 for use during the next N events, and the program recycles to step 50. For the largest remaining k, the associated bin lamp is flashed, and the program continues in this loop until x and y have been brought into equality.

EXAMPLE

Table 1, a moving portion of which is displayed on the data display 28, shows a sample list of 150 events. In a practical case, the number of events in the list may be several hundred or even a thousand or more. Item identification numbers (tape ID numbers) are shown adjacent to the numbered event lines. The sample list includes several repetitions of the same item to illustrate the operation of the algorithm. As the events are executed, the event list justifies itself so that the current item is always at the top of the list. Table 2 shows the status at the START and at events 30 and 51 of the bin lamps during execution of step S50 (FIG. 2), but before the value of k is reset to zero.

When the list is at the START, assuming proper loading of cassettes with the receiver 14, all lamps will be lit, indicating that each item is required somewhere in the list. There are no items missing within the critical load area (assumed to be the next 20 events); thus it is not necessary to flash any lamps.

At event 030, the system tries to make room for the cassettes needed to execute the next twenty events (N=20). Two bins 11 and 12 are available for four items that must be loaded. The ranking scheme determines that the items stored in bins 24 and 25 (ID Nos. 98 and 99) have the lowest priority and thus the system will flash these two bin lamps, making an additional two bins available.

Of course, the situation shown at event 030 in Table 2 does not develop instantaneously; at the conclusion of each event, only one lamp changes its status from "on" to "flashing" or "off", since the system justifies itself upon execution of each event. The situation shown at event 030 in Table 2 implies that the user of the system has taken no corrective action for at least the last four events. Once new cassettes are inserted properly, all the lamps revert to the "on" state.

At event 51, x equals eight (eight cassettes needed to execute the next twenty events are missing from the receiver 14) and y equals four (there are only four available bins). Hence, another four bins must be made available. Accordingly, bin lamps 28, 29, 30 and 31 corresponding to cassettes having the lowest priority of the cassettes loaded in the receiver 14, will flash. T,0160 T,0170

In Table 1, the dashed lines corresponding to events 005, 010, 015, 020, 030, 035, 040, 045, 050, 058, 063, 105, 110, 115, 120, 130, 140, 145 and 150 correspond to "live" or other "off-machine" portions of the broadcast. Events 001 through 004 correspond to cassettes identified by numbers 001 through 004 and stored in bins 01 through 04. Events 006 through 009 correspond to cassettes identified by numbers 005 through 008 and stored in bins 05 through 08. Events 011 through 014 correspond to cassettes identified by numbers 009 through 012 and stored in bins 09 through 12. Events 016 through 019 correspond to cassettes identified by numbers 013 through 016 and stored in bins 13 through 16. Events 021 through 029 correspond to cassettes identified by numbers 017 through 025 and stored in bins 17 through 25.

At events 031 through 034 cassettes identified by numbers 001 through 004 are reused and are already in bins 01 through 04. Events 036 through 039 correspond to cassettes identified by numbers 091 through 094. These are not yet loaded into the machine 14 and so their bin numbers are identified in the data display terminal 28 by "?". Events 041 through 044 correspond to cassettes identified by numbers 009, 010, 026 and 027, respectively, and are stored in bins 09, 10, 26 and 27, respectively. Events 046 through 049 correspond to cassettes identified by numbers 028 through 031 and stored in bins 28 through 31, respectively. Events 051 through 057 correspond to cassettes identified by numbers 032 through 038 and stored in bins 32 through 38, respectively. Events 059 and 060 correspond to cassettes identified by numbers 039 and 040 and stored in bins 39 and 40, respectively. Event 61 corresponds to event 001 which is already stored in bin 01. Event 62 corresponds to a cassette identified by number 095 and not yet stored in the machine 14 and so its bin number is indicated by "?". Events 064 through 100 correspond to cassettes identified by numbers 050 through 086, respectively, and not yet loaded in the machine 14 and so have their bin numbers indicated by "?".

Events 101 through 104 correspond to cassettes 001 through 004 which are already loaded in bins 01 through 04. Events 106 through 109 correspond to cassettes 005 through 008 which are already in bins 05 through 08.

Events 111 through 114 correspond to cassettes identified by numbers 109 through 112 and not yet loaded into the receiver 14 and so their bin numbers are designated by "?".

Events 116 through 119 correspond to cassettes 013 through 016 which are already stored in bins 13 through 16. Events 121 through 129 correspond to cassettes 017 through 025 which are already stored in bins 17 through 25.

Events 131 through 139 correspond to cassettes 026 through 034 which are already stored in bins 26 through 34. Events 141 through 144 correspond to cassettes 035 through 038 which are already stored in bins 35 through 38. Events 146 through 149 correspond to cassettes 039, 040, 001 and 002, which are already respectively stored in bins 39, 40, 01 and 02.

As Table 2 shows, at the START, x (the number of cassettes that are to be used within the next N events but have not yet been loaded into the receiver 14) and y (the number of bin lamps in the "off" state) are both equal to 0. The priority number k is indicated for each of the bins 01 through 40. These priorities range from 1 (highest priority) in the case of bin 01 to 60 (lowest priority) in the case of bin 40. The associated lamp is in the "on" state in each case.

At event 30, x equals 4 and y equals 2. The priorities associated with the bins 01 through 40 range from 1 in the case of bin 01 to 99 in the case of bin 25. In addition, bins 11 and 12 have zero priority, and their respectively associated bin lamps are in the "off" state. The lamps for all of the bins are in the "on" state, except for the lamps associated with bins 24 and 25, which are flashing.

Since x equals 4, it is necessary to remove cassettes from four bins in order to make room in the receiver 14 for four new cassettes that are scheduled for use within the next 20 events (N=20). The cassettes in bins 11 and 12, whose bin lamps are off, can be returned to the tape library 12. The cassettes in bins 24 and 25 can be removed, but should be retained at the receiver 14 because they are needed for later use.

At event 51, x equals 8 and y equals 4. The priorities k range from 1 in the case of bin 32 to 86 in the case of bin 31. In addition, the cassettes in bins 09 through 12 have zero priority. The lamps associated with all of the bins except 09 through 12 and 28 through 31 are in the "on" state. The lamps associated with bins 09 through 12 are off, indicating that the cassettes in those bins are not needed to execute the balance of the events on the master list and can be removed from the receiver 14 and returned to the tape library 12. The lamps associated with bins 28 through 31 are flashing, indicating that the cassettes in those bins can be removed from the receiver 14 but should be retained in the vicinity of the receiver 14 because they are required for later use.

Thus there is provided in accordance with the invention a novel and highly-effective method of assisting a user to supply items from a master storage facility to an on-line storage facility that facilitates automatic feeding the items to a processing station in a series of events. The invention maximizes efficiency by identifying to a user of the system the items to withdraw from the on-line storage facility and informing the user whether to retain the withdrawn items for subsequent reinsertion in the on-line storage facility or return them to the master storage facility. It is estimated that, as compared to the most advanced techniques heretofore available, the invention as applied to television broadcasting will save about two hours of an operator's time per work shift.

Many modifications of the preferred embodiment of the invention disclosed herein will readily occur to those skilled in the art. In particular, while the invention is disclosed as adapted to assist a user to supply tapes from a tape library to a multi-cassette receiver, it is applicable also to supplying items generally (compact discs, microfiche, drums of oil, etc.) from any master storage facility to any on-line storage facility of smaller capacity that facilitates automatic feeding of the items to a processing station in a series of events. Moreover, while the signaling means is disclosed above as lamps that are "on", "flashing" or "off", lamps of different colors or audible signals, etc., can be substituted. Accordingly, the invention is not limited except by the appended claims.

I claim:

1. A method of assisting a user to supply items from a master storage facility to an on-line storage facility that has a capacity of A items and that facilitates automatic feeding of the items to a processing station in a series of events; said method comprising the steps of:

preparing a master list of events setting forth the events in a sequence from top to bottom and items respectively corresponding thereto;

identifying items corresponding to events in said master list currently in the on-line storage facility;

selecting a critical load area consisting of a predetermined number of events N from the items identified at the top of the current list, wherein $0 \leq N \leq A$;

making a determination of:

a first set consisting of first priority items to be housed in the on-line storage facility for subsequent automatic feeding to the processing station, a second set consisting of second priority items to be withdrawn from the on-line storage facility to make room for insertion of additional items from the master storage facility and retained for subsequent reinsertion in the on-line storage facility, and a third set consisting of zero priority items to be withdrawn from the on-line storage facility and returned to the master storage facility;

signaling the results of said determination to the user; and stocking the selected critical load area of said on-line storage facility with said items in accordance with said determined first, second, and zero priorities.

2. A method according to claim 1 wherein said determination comprises the steps of:

inspecting a current balance of events in the master list;

determining the items equal in number to y that are in said on-line storage facility that do not correspond to events in said current balance of said master list;

assigning said y items to said third set consisting of zero priority items;

inspecting next sequential N events of said ritical load area;

determining the items equal in number to x that are to be used within the next N events but have not yet been loaded into said on-line storage facility;

determining the items equal in number to x-y that are in said on-line storage facility but stand farthest from the top of the master list;

assigning the determined x-y items to said second set consisting of second priority items;

withdrawing said y items and saids x-y items from said on-line storage facility to make room for said x items;

inserting said x items in said on-line storage facility; and assigning said inserted x items and the remining items in said on-line storage facility to said first set consisting of first priority items.

3. A method according to claim 1; wherein said determination and signaling are updated in connection with each of said events.

4. A method according to claim 1; wherein the signaling of items to be left in the on-line storage facility is accomplished by associating a lamp therewith and placing the lamp in the "on" state.

5. A method according to claim 1; wherein the signaling of items to be withdrawn from the on-line storage facility and retained for subsequent reinsertion in the on-line storage facility is accomplished by associating a lamp therewith and flashing the lamp alternately between the "on" and "off" states.

6. A method according to claim 1; wherein the signaling of items to be withdrawn from the on-line storage facility and returned to the master storage facility is accomplished by associating a lamp therewith and placing the lamp in the "off" state.

7. A method according to claim 1; wherein said items are tape cassettes, said master storage facility is a tape cassette library, said on-line storage facility is a multi-cassette receiver, said processing station comprises at least one tape recorder/reproducer, and said events are broadcasting segments.

* * * * *

UNITED STATES PATENT AND TRADEMARK OFFICE
CERTIFICATE OF CORRECTION

PATENT NO. : 4,739,491

DATED : April 19, 1988

INVENTOR(S) : Raymond K. Baldock

It is certified that error appears in the above-identified patent and that said Letters Patent is hereby corrected as shown below:

Column 2, line 1 after "apparatus" delete ".".

Column 7, lines 1 and 2 delete "T,0160 T,0170".

Column 7, lines 2 and 3, Tables 1 and 2 should be inserted as per attached sheets.

IN CLAIMS

Column 9, line 40, change "ritical" to --critical--.

Column 10, line 9, change "saids" to --said--.

Signed and Sealed this

Seventeenth Day of January, 1989

*Attest:*

DONALD J. QUIGG

*Attesting Officer*     *Commissioner of Patents and Trademarks*

Patent No. 4,739,491
Page 2 of 3
April 19, 1988

ORIGINAL EVENT LIST

Table 1.

| EVENT | ID  | BIN | EVENT | ID  | BIN | EVENT | ID  | BIN |
|-------|-----|-----|-------|-----|-----|-------|-----|-----|
| 001   | 001 | 01  | 051   | 032 | 32  | 101   | 001 | 01  |
| 002   | 002 | 02  | 052   | 033 | 33  | 102   | 002 | 02  |
| 003   | 003 | 03  | 053   | 034 | 34  | 103   | 003 | 03  |
| 004   | 004 | 04  | 054   | 035 | 35  | 104   | 004 | 04  |
| 005   | --- | --- | 055   | 036 | 36  | 105   | --- | --- |
| 006   | 005 | 05  | 056   | 037 | 37  | 106   | 005 | 05  |
| 007   | 006 | 06  | 057   | 038 | 38  | 107   | 006 | 06  |
| 008   | 007 | 07  | 058   | --- | --- | 108   | 007 | 07  |
| 009   | 008 | 08  | 059   | 039 | 39  | 109   | 008 | 08  |
| 010   | --- | --- | 060   | 040 | 40  | 110   | --- | --- |
| 011   | 009 | 09  | 061   | 001 | 01  | 111   | 109 | ?   |
| 012   | 010 | 10  | 062   | 095 | ?   | 112   | 110 | ?   |
| 013   | 011 | 11  | 063   | --- | --- | 113   | 111 | ?   |
| 014   | 012 | 12  | 064   | 050 | ?   | 114   | 112 | ?   |
| 015   | --- | --- | 065   | 051 | ?   | 115   | --- | --- |
| 016   | 013 | 13  | 066   | 052 | ?   | 116   | 013 | 13  |
| 017   | 014 | 14  | 067   | 053 | ?   | 117   | 014 | 14  |
| 018   | 015 | 15  | 068   | 054 | ?   | 118   | 015 | 15  |
| 019   | 016 | 16  | 069   | 055 | ?   | 119   | 016 | 16  |
| 020   | --- | --- | 070   | 056 | ?   | 120   | --- | --- |
| 021   | 017 | 17  | 071   | 057 | ?   | 121   | 017 | 17  |
| 022   | 018 | 18  | 072   | 058 | ?   | 122   | 018 | 18  |
| 023   | 019 | 19  | 073   | 059 | ?   | 123   | 019 | 19  |
| 024   | 020 | 20  | 074   | 060 | ?   | 124   | 020 | 20  |
| 025   | 021 | 21  | 075   | 061 | ?   | 125   | 021 | 21  |
| 026   | 022 | 22  | 076   | 062 | ?   | 126   | 022 | 22  |
| 027   | 023 | 23  | 077   | 063 | ?   | 127   | 023 | 23  |
| 028   | 024 | 24  | 078   | 064 | ?   | 128   | 024 | 24  |
| 029   | 025 | 25  | 079   | 065 | ?   | 129   | 025 | 25  |
| 030   | --- | --- | 080   | 066 | ?   | 130   | --- | --- |
| 031   | 001 | 01  | 081   | 067 | ?   | 131   | 026 | 26  |
| 032   | 002 | 02  | 082   | 068 | ?   | 132   | 027 | 27  |
| 033   | 003 | 03  | 083   | 069 | ?   | 133   | 028 | 28  |
| 034   | 004 | 04  | 084   | 070 | ?   | 134   | 029 | 29  |
| 035   | --- | --- | 085   | 071 | ?   | 135   | 030 | 30  |
| 036   | 091 | ?   | 086   | 072 | ?   | 136   | 031 | 31  |
| 037   | 092 | ?   | 087   | 073 | ?   | 137   | 032 | 32  |
| 038   | 093 | ?   | 088   | 074 | ?   | 138   | 033 | 33  |
| 039   | 094 | ?   | 089   | 075 | ?   | 139   | 034 | 34  |
| 040   | --- | --- | 090   | 076 | ?   | 140   | --- | --- |
| 041   | 009 | 09  | 091   | 077 | ?   | 141   | 035 | 35  |
| 042   | 010 | 10  | 092   | 078 | ?   | 142   | 036 | 36  |
| 043   | 026 | 26  | 093   | 079 | ?   | 143   | 037 | 37  |
| 044   | 027 | 27  | 094   | 080 | ?   | 144   | 038 | 38  |
| 045   | --- | --- | 095   | 081 | ?   | 145   | --- | --- |
| 046   | 028 | 28  | 096   | 082 | ?   | 146   | 039 | 39  |
| 047   | 029 | 29  | 097   | 083 | ?   | 147   | 040 | 40  |
| 048   | 030 | 30  | 098   | 084 | ?   | 148   | 001 | 01  |
| 049   | 031 | 31  | 099   | 085 | ?   | 149   | 002 | 02  |
| 050   | --- | --- | 100   | 086 | ?   | 150   | --- | --- |

Patent No. 4,739,491

BIN LAMP STATUS

Table 2.

CRITICAL LOAD AREA N = 20 events; Capacity A = 40 bins

| | EVENT AT TOP OF LIST | START | | 030 | | 051 | |
|---|---|---|---|---|---|---|---|
| VARIABLE | $x$ | 0 | | 4 | | 8 | |
| | $y$ | 0 | | 2 | | 4 | |
| | | k | LAMP | k | LAMP | k | LAMP |
| BIN NO. (i) | 01 | 1 | ON | 1 | ON | 11 | ON |
| | 02 | 2 | ON | 2 | ON | 12 | ON |
| | 03 | 3 | ON | 3 | ON | 53 | ON |
| | 04 | 4 | ON | 4 | ON | 54 | ON |
| | 05 | 6 | ON | 76 | ON | 56 | ON |
| | 06 | 7 | ON | 77 | ON | 57 | ON |
| | 07 | 8 | ON | 78 | ON | 58 | ON |
| | 08 | 9 | ON | 79 | ON | 59 | ON |
| | 09 | 11 | ON | 11 | ON | 0 | OFF |
| | 10 | 12 | ON | 12 | ON | 0 | OFF |
| | 11 | 13 | ON | 0 | OFF | 0 | OFF |
| | 12 | 14 | ON | 0 | OFF | 0 | OFF |
| | 13 | 16 | ON | 86 | ON | 66 | ON |
| | 14 | 17 | ON | 87 | ON | 67 | ON |
| | 15 | 18 | ON | 88 | ON | 68 | ON |
| | 16 | 19 | ON | 89 | ON | 69 | ON |
| | 17 | 21 | ON | 91 | ON | 71 | ON |
| | 18 | 22 | ON | 92 | ON | 72 | ON |
| | 19 | 23 | ON | 93 | ON | 73 | ON |
| | 20 | 24 | ON | 94 | ON | 74 | ON |
| | 21 | 25 | ON | 95 | ON | 75 | ON |
| | 22 | 26 | ON | 96 | ON | 76 | ON |
| | 23 | 27 | ON | 97 | ON | 77 | ON |
| | 24 | 28 | ON | 98 | FL | 78 | ON |
| | 25 | 29 | ON | 99 | FL | 79 | ON |
| | 26 | 43 | ON | 13 | ON | 81 | ON |
| | 27 | 44 | ON | 14 | ON | 82 | ON |
| | 28 | 46 | ON | 16 | ON | 83 | FL |
| | 29 | 47 | ON | 17 | ON | 84 | FL |
| | 30 | 48 | ON | 18 | ON | 85 | FL |
| | 31 | 49 | ON | 19 | ON | 86 | FL |
| | 32 | 51 | ON | 21 | ON | 1 | ON |
| | 33 | 52 | ON | 22 | ON | 2 | ON |
| | 34 | 53 | ON | 23 | ON | 3 | ON |
| | 35 | 54 | ON | 24 | ON | 4 | ON |
| | 36 | 55 | ON | 25 | ON | 5 | ON |
| | 37 | 56 | ON | 26 | ON | 6 | ON |
| | 38 | 57 | ON | 27 | ON | 7 | ON |
| | 39 | 59 | ON | 29 | ON | 9 | ON |
| | 40 | 60 | ON | 30 | ON | 10 | ON |